(12) United States Patent
McAlister

(10) Patent No.: US 8,771,636 B2
(45) Date of Patent: Jul. 8, 2014

(54) CHEMICAL PROCESSES AND REACTORS FOR EFFICIENTLY PRODUCING HYDROGEN FUELS AND STRUCTURAL MATERIALS, AND ASSOCIATED SYSTEMS AND METHODS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 13/684,987

(22) Filed: Nov. 26, 2012

(65) Prior Publication Data

US 2013/0174486 A1   Jul. 11, 2013

Related U.S. Application Data

(60) Continuation of application No. 13/027,208, filed on Feb. 14, 2011, now Pat. No. 8,318,131, which is a continuation-in-part of application No. 12/084,509, filed on Jul. 21, 2010, now Pat. No. 8,561,598, which is a continuation-in-part of application No. 12/581,825, filed on Oct. 19, 2009, now Pat. No. 8,297,254, which is a division of application No. 12/006,774, filed on Jan. 7, 2008, now Pat. No. 7,628,137, said application No. 12/804,509 is a continuation-in-part of application No. 12/653,085, filed on Dec. 7, 2009, which is a continuation-in-part of application No. 12/006,774, filed on Jan. 7, 2008, now Pat. No. 7,628,137, said application No. 12/804,509 is a continuation-in-part of application No. PCT/US2009/067044, filed on Dec. 7, 2009.

(60) Provisional application No. 61/237,425, filed on Aug. 27, 2009, provisional application No. 61/237,466, filed on Aug. 27, 2009, provisional application No. 61/237,479, filed on Aug. 27, 2009, provisional application No. 61/238,466, filed on Aug. 31, 2009, provisional application No. 61/304,403, filed on Feb. 13, 2010, provisional application No. 61/312,100, filed on Mar. 9, 2010, provisional application No. 61/237,466, filed on Aug. 31, 2009.

(51) Int. Cl.
*C01B 3/22* (2006.01)
*C01B 3/24* (2006.01)

(52) U.S. Cl.
USPC ............... 423/648.1; 48/197 R; 48/198.1; 75/330; 423/298; 423/348; 423/351; 423/418.2; 423/437.1; 423/445 R; 423/567.1; 423/650

(58) Field of Classification Search
USPC ....... 48/127.5, 197 R, 198.1; 423/644, 648.1, 423/650, 445 R, 351, 298, 348.1, 567.1; 252/373; 588/240, 242; 422/186, 422/186.3; 201/7, 21, 30; 202/96, 117, 118; 75/330
See application file for complete search history.

(56) References Cited

U.S. PATENT DOCUMENTS 3,613,792 A    10/1971   Hyde et al.
3,633,372 A     1/1972   Kimmel et al.
(Continued)

FOREIGN PATENT DOCUMENTS

CN    101042261 A    9/2007
CN    101091900 A   12/2007
(Continued)

OTHER PUBLICATIONS

U.S. Appl. No. 13/685,075, filed Nov. 26, 2012, McAlister.
(Continued)

*Primary Examiner* — Stanley Silverman
*Assistant Examiner* — Syed Iqbal
(74) *Attorney, Agent, or Firm* — Perkins Coie LLP

(57) ABSTRACT

Chemical processes and reactors for efficiently producing hydrogen fuels and structural materials and associated systems and methods. A representative process includes dissociating a hydrogen donor into dissociation products by adding energy to the hydrogen donor, wherein the energy includes waste heat generated by a process other than dissociating the hydrogen donor. The process can further include providing, from the dissociation products, a structural building block and/or a hydrogen-based fuel, with the structural building block based on carbon, nitrogen, boron, silicon, sulfur, and/or a transition metal.

16 Claims, 6 Drawing Sheets

(56) References Cited

U.S. PATENT DOCUMENTS

| | | | |
|---|---|---|---|
| 3,662,832 A | 5/1972 | Keeler et al. |
| 3,788,389 A | 1/1974 | Waters |
| 3,807,491 A | 4/1974 | Van Hulsen |
| 3,830,508 A | 8/1974 | Endicott |
| 3,840,068 A | 10/1974 | Waters |
| 3,882,937 A | 5/1975 | Robinson |
| 3,936,652 A | 2/1976 | Levine |
| 3,986,362 A | 10/1976 | Baciu |
| 4,019,868 A | 4/1977 | Sebacher et al. |
| 4,053,576 A | 10/1977 | Fletcher |
| 4,070,861 A | 1/1978 | Scragg et al. |
| 4,082,865 A | 4/1978 | Ban et al. |
| 4,099,489 A | 7/1978 | Bradley |
| 4,138,993 A | 2/1979 | Conley |
| 4,158,354 A | 6/1979 | Carden |
| 4,161,211 A | 7/1979 | Duffy et al. |
| 4,169,460 A | 10/1979 | Popovich et al. |
| 4,172,506 A | 10/1979 | Terry |
| 4,178,987 A | 12/1979 | Bowman et al. |
| 4,229,184 A | 10/1980 | Gregg |
| 4,257,239 A | 3/1981 | Partin et al. |
| 4,343,338 A | 8/1982 | Hart |
| 4,382,189 A | 5/1983 | Wilson |
| 4,386,801 A | 6/1983 | Chapman et al. |
| 4,401,689 A | 8/1983 | Ban |
| 4,455,045 A | 6/1984 | Wheeler |
| 4,519,342 A | 5/1985 | Yoon |
| 4,549,528 A | 10/1985 | Gibson |
| 4,601,508 A | 7/1986 | Kerian |
| 4,611,847 A | 9/1986 | Sullivan |
| 4,620,580 A | 11/1986 | Groezinger et al. |
| 4,704,267 A | 11/1987 | DiMartino |
| 4,706,651 A | 11/1987 | Yudow |
| 4,746,160 A | 5/1988 | Wiesemeyer |
| 4,848,445 A | 7/1989 | Harper |
| 4,921,580 A | 5/1990 | Martes et al. |
| 4,978,162 A | 12/1990 | Labbe |
| 5,058,945 A | 10/1991 | Elliott, Sr. et al. |
| 5,119,897 A | 6/1992 | Moriwake |
| 5,132,090 A | 7/1992 | Volland |
| 5,222,698 A | 6/1993 | Nelson et al. |
| 5,280,990 A | 1/1994 | Rinard |
| 5,315,868 A | 5/1994 | Jacobi et al. |
| 5,348,774 A | 9/1994 | Golecki et al. |
| 5,407,245 A | 4/1995 | Geropp |
| 5,442,934 A | 8/1995 | Wolflick |
| 5,498,059 A | 3/1996 | Switlik |
| 5,560,443 A | 10/1996 | DuBose |
| 5,618,134 A | 4/1997 | Balch |
| 5,647,877 A | 7/1997 | Epstein |
| 5,881,559 A | 3/1999 | Kawamura |
| 5,882,382 A | 3/1999 | Hachisuka et al. |
| 5,986,429 A | 11/1999 | Mula, Jr. |
| 6,012,065 A | 1/2000 | Boucher et al. |
| 6,068,328 A | 5/2000 | Gazdzinski |
| 6,074,696 A | 6/2000 | Sato |
| 6,081,183 A | 6/2000 | Mading et al. |
| 6,089,224 A | 7/2000 | Poulek |
| 6,092,861 A | 7/2000 | Whelan |
| 6,155,212 A | 12/2000 | McAlister |
| 6,200,069 B1 | 3/2001 | Miller |
| 6,216,599 B1 | 4/2001 | Cavanagh |
| 6,220,193 B1 | 4/2001 | Dilks |
| 6,242,752 B1 | 6/2001 | Soma et al. |
| 6,309,010 B1 | 10/2001 | Whitten |
| 6,334,928 B1 | 1/2002 | Sekine et al. |
| 6,378,932 B1 | 4/2002 | Fasel et al. |
| 6,409,252 B1 | 6/2002 | Andrus |
| 6,464,755 B2 | 10/2002 | Nakanishi et al. |
| 6,502,533 B1 * | 1/2003 | Meacham ............ 123/3 |
| 6,508,209 B1 | 1/2003 | Collier, Jr. |
| 6,531,704 B2 | 3/2003 | Yadav et al. |
| 6,534,210 B2 | 3/2003 | Luken et al. |
| 6,571,747 B1 | 6/2003 | Gerstweiler |
| 6,585,785 B1 | 7/2003 | Warren et al. |
| 6,630,267 B2 | 10/2003 | Badding et al. |
| 6,749,043 B2 | 6/2004 | Brown et al. |
| 6,756,140 B1 | 6/2004 | McAlister |
| 6,756,565 B2 | 6/2004 | Suenaga et al. |
| 6,838,782 B2 | 1/2005 | Vu |
| 6,854,788 B1 | 2/2005 | Graham |
| 6,881,508 B2 | 4/2005 | Penev |
| 6,886,249 B2 | 5/2005 | Smalc |
| 6,897,575 B1 | 5/2005 | Yu |
| 6,908,297 B2 | 6/2005 | Dafft et al. |
| 6,919,062 B1 | 7/2005 | Vasileiadis et al. |
| 6,926,345 B2 | 8/2005 | Ortega et al. |
| 6,979,049 B2 | 12/2005 | Ortega et al. |
| 7,014,737 B2 | 3/2006 | Harutyunyan et al. |
| 7,033,570 B2 * | 4/2006 | Weimer et al. ............ 423/650 |
| 7,051,794 B2 | 5/2006 | Luo |
| 7,140,181 B1 | 11/2006 | Jensen et al. |
| 7,152,908 B2 | 12/2006 | Shahbazi |
| 7,165,804 B2 | 1/2007 | Shahbazi |
| 7,179,383 B1 | 2/2007 | Porter et al. |
| 7,185,944 B2 | 3/2007 | Shahbazi |
| 7,207,620 B2 | 4/2007 | Cosgrove et al. |
| 7,210,467 B2 | 5/2007 | Kweon et a |
| 7,211,905 B1 | 5/2007 | McDavid, Jr. |
| 7,237,827 B2 | 7/2007 | Shahbazi |
| 7,243,980 B2 | 7/2007 | Vala |
| 7,250,151 B2 | 7/2007 | Tonkovich et al. |
| 7,285,350 B2 | 10/2007 | Keefer et al. |
| 7,293,533 B2 | 11/2007 | Hemsath |
| 7,337,612 B2 | 3/2008 | Skinnes et al. |
| 7,397,141 B2 | 7/2008 | Gouker |
| 7,420,004 B2 | 9/2008 | Hardy et al. |
| 7,426,959 B2 | 9/2008 | Wang et al. |
| 7,449,158 B2 | 11/2008 | Haueter et al. |
| 7,484,553 B2 | 2/2009 | Lai et al. |
| 7,527,094 B2 | 5/2009 | McKinzie et al. |
| 7,568,479 B2 | 8/2009 | Rabinowitz |
| 7,582,167 B2 | 9/2009 | Kaszuba et al. |
| 7,585,339 B2 | 9/2009 | Dahl et al. |
| 7,587,998 B2 | 9/2009 | Hotta et al. |
| 7,597,068 B2 | 10/2009 | Arai et al. |
| 7,621,262 B2 | 11/2009 | Zubeck |
| 7,628,137 B1 | 12/2009 | McAlister |
| 7,692,170 B2 | 4/2010 | Gaus et al. |
| 7,713,642 B2 | 5/2010 | Warner et al. |
| 7,714,258 B2 | 5/2010 | Dalton |
| 7,753,122 B2 | 7/2010 | Curlett |
| 7,775,261 B2 | 8/2010 | Valenzuela |
| 7,788,924 B2 | 9/2010 | Hines |
| 7,789,182 B2 | 9/2010 | Bradley et al. |
| 7,808,121 B1 | 10/2010 | Glynn |
| 7,884,308 B1 | 2/2011 | Mejia |
| 7,943,045 B2 | 5/2011 | Rohrich et al. |
| 7,955,478 B2 | 6/2011 | Mcclure |
| 7,971,861 B2 | 7/2011 | Soininen |
| 7,972,471 B2 | 7/2011 | Sant |
| 8,043,592 B2 | 10/2011 | Krass |
| 8,053,916 B2 | 11/2011 | Edwards et al. |
| 8,083,520 B2 | 12/2011 | Mueller et al. |
| 8,136,740 B2 | 3/2012 | Hagen et al. |
| 8,187,549 B2 | 5/2012 | Mcalister |
| 8,187,550 B2 | 5/2012 | Mcalister |
| 8,220,539 B2 | 7/2012 | Vinegar et al. |
| 8,318,100 B2 | 11/2012 | McAlister |
| 8,318,131 B2 | 11/2012 | McAlister |
| 8,318,269 B2 | 11/2012 | Mcalister |
| 8,449,634 B2 | 5/2013 | Tamura et al. |
| 2002/0102188 A1 | 8/2002 | Hsu et al. |
| 2003/0008183 A1 | 1/2003 | Hsu |
| 2003/0178195 A1 | 9/2003 | Agee et al. |
| 2004/0079087 A1 * | 4/2004 | Chandran et al. ............ 60/781 |
| 2004/0200618 A1 | 10/2004 | Piekenbrock |
| 2004/0219737 A1 | 11/2004 | Quon |
| 2004/0247957 A1 | 12/2004 | Hatano et al. |
| 2004/0253168 A1 | 12/2004 | Chu |
| 2004/0265448 A1 | 12/2004 | Shiau et al. |
| 2004/0266615 A1 | 12/2004 | Watson et al. |
| 2005/0029120 A1 | 2/2005 | Bar-Gadda |
| 2005/0061486 A1 | 3/2005 | Yang |

(56) References Cited

U.S. PATENT DOCUMENTS

| | | |
|---|---|---|
| 2005/0079977 A1 | 4/2005 | Choi et al. |
| 2005/0265919 A1 | 12/2005 | Lomax et al. |
| 2005/0272856 A1 | 12/2005 | Cooper et al. |
| 2006/0005738 A1 | 1/2006 | Kumar |
| 2006/0005739 A1 | 1/2006 | Kumar |
| 2006/0048808 A1 | 3/2006 | Ruckman et al. |
| 2006/0266043 A1 | 11/2006 | Jerome |
| 2007/0031718 A1 | 2/2007 | Fujimura et al. |
| 2007/0065686 A1 | 3/2007 | Fan et al. |
| 2007/0138006 A1 | 6/2007 | Oakes et al. |
| 2007/0191664 A1 | 8/2007 | Hershkowitz et al. |
| 2007/0205298 A1 | 9/2007 | Harrison et al. |
| 2008/0086946 A1 | 4/2008 | Weimer et al. |
| 2008/0098654 A1 | 5/2008 | Cherry et al. |
| 2008/0170975 A1 | 7/2008 | Ahn et al. |
| 2008/0175766 A1 | 7/2008 | Mankins et al. |
| 2008/0241033 A1 | 10/2008 | Nazri |
| 2008/0295883 A1 | 12/2008 | Ducellier et al. |
| 2009/0062591 A1 | 3/2009 | Bingue et al. |
| 2009/0206666 A1 | 8/2009 | Sella et al. |
| 2009/0258278 A1 | 10/2009 | Steinberg |
| 2009/0313886 A1 | 12/2009 | Hinman et al. |
| 2010/0000874 A1 | 1/2010 | Hinman et al. |
| 2010/0043404 A1 | 2/2010 | Hebbale et al. |
| 2010/0107994 A1 | 5/2010 | Moriarty et al. |
| 2010/0140950 A1 | 6/2010 | Pitre |
| 2010/0174124 A1 | 7/2010 | Tonkovich et al. |
| 2010/0242352 A1 | 9/2010 | Perkins et al. |
| 2011/0061295 A1 | 3/2011 | Mcalister |
| 2011/0061383 A1 | 3/2011 | Mcalister |
| 2011/0200516 A1 | 8/2011 | Mcalister |
| 2011/0203776 A1 | 8/2011 | Mcalister |
| 2011/0206565 A1 | 8/2011 | Mcalister |
| 2011/0214986 A1 | 9/2011 | Brown |
| 2011/0220040 A1 | 9/2011 | McAlister |
| 2011/0284298 A1 | 11/2011 | Ajisaka |
| 2011/0315539 A1 | 12/2011 | Zadik et al. |
| 2012/0118878 A1 | 5/2012 | Kim et al. |
| 2012/0119510 A1 | 5/2012 | Herzen et al. |
| 2013/0094909 A1 | 4/2013 | Mcalister |
| 2013/0098035 A1 | 4/2013 | McAlister |
| 2013/0101492 A1 | 4/2013 | McAlister |
| 2013/0101502 A1 | 4/2013 | McAlister |
| 2013/0101908 A1 | 4/2013 | Mcalister |
| 2013/0136658 A1 | 5/2013 | Mcalister |
| 2013/0145761 A1 | 6/2013 | McAlister |
| 2013/0149208 A1 | 6/2013 | Mcalister |
| 2013/0149621 A1 | 6/2013 | Mcalister |
| 2013/0153399 A1 | 6/2013 | McAlister |
| 2013/0156504 A1 | 6/2013 | Mcalister |
| 2013/0158828 A1 | 6/2013 | Mcalister |
| 2013/0174486 A1 | 7/2013 | McAlister |
| 2013/0213256 A1 | 8/2013 | McAlister |

FOREIGN PATENT DOCUMENTS

| | | |
|---|---|---|
| CN | 101597025 A | 12/2009 |
| EA | 200702287 A1 | 4/2008 |
| EP | 1658892 A1 | 5/2006 |
| GB | 191024256 A | 0/1911 |
| JP | 58120510 A | 7/1983 |
| JP | 59046375 | 3/1984 |
| JP | S62203328 A | 9/1987 |
| JP | H0637348 | 5/1994 |
| JP | 0725637 | 3/1995 |
| JP | 0940491 | 2/1997 |
| JP | 09055374 | 2/1997 |
| JP | 10172960 | 6/1998 |
| JP | 2000353690 A | 12/2000 |
| JP | 2001181846 A | 7/2001 |
| JP | 2001262353 A | 9/2001 |
| JP | 03215670 B2 | 10/2001 |
| JP | 2002158175 A | 5/2002 |
| JP | 2003040601 A | 2/2003 |
| JP | 2003166059 A | 6/2003 |
| JP | 2005511467 A | 6/2003 |
| JP | 2005021876 A | 1/2005 |
| JP | 2005213069 A | 8/2005 |
| JP | 2007150012 A | 6/2007 |
| JP | 2007208076 A | 8/2007 |
| JP | 2007254180 A | 10/2007 |
| JP | 2009010263 A | 1/2009 |
| JP | 2010003568 A | 1/2010 |
| JP | 2010006653 A | 1/2010 |
| JP | 2010025031 A | 2/2010 |
| KR | 100794943 B1 | 1/2008 |
| RU | 2011864 C1 | 4/1994 |
| RU | 2120913 C1 | 10/1998 |
| RU | 2312059 C1 | 12/2007 |
| RU | 2403379 C1 | 11/2010 |
| SU | 1498908 A1 | 8/1989 |
| SU | 1776298 | 11/1992 |
| WO | WO-2007140441 A2 | 12/2007 |
| WO | WO-2008031488 A1 | 3/2008 |
| WO | WO-2008035776 A1 | 3/2008 |
| WO | WO-2009098375 A1 | 8/2009 |
| WO | WO-2010097890 A1 | 9/2010 |

OTHER PUBLICATIONS

U.S. Appl. No. 13/684,743, filed Nov. 26, 2012, McAlister.
U.S. Appl. No. 13/832,710, filed Mar. 15, 2013, McAlister.
Elias et al., "Control of Graphene's Properties by Reversible Hydrogenation: Evidence for Graphene", Science, vol. 23, 2009, pp. 610-613.
International Search Report and Written Opinion for PCT Application No. PCT/US11/024804; Applicant: McAlister Technologies, LLC; Date of Mailing: Oct. 24, 2011; 9 pages.
"Carnot Thermochemical Cycles." Digital image. Wikipedia, the Free Encyclopedia, Published: Aug. 31, 2010. Accessed: Jan. 4, 2011. Printed: May 20, 2011. <http://en.wikipedia.org/wiki/File:Carnot_thermochemical_cycles.PNG>. p. 1.
"Closed Loop Thermochemical Energy Storage System Using Ammonia." Australian National University College of Engineering & Computer Science—Solar Thermal Group. Accessed: Jan. 4, 2011. Printed: May 20, 2011. <http://solar-thermal.anu.edu.au/high-temperature/thermochemical-energy-storage/>. pp. 1-2.
"SI Cycle." Digital image. Sandia National Laboratories: Energy, Resources and Nonproliferation. Accessed: Jan. 4, 2011. Printed: Jun. 13, 2011. <http://www.sandia.gov/ERN/images/SI-cycle2.jpg>. p. 1.
"Solar Hydrogen." Digital image. Swiss Federal Institute of Technology, Department of Mechanical and Process Engineering, Zurich. Accessed: Jan. 4, 2011. Printed: May 23, 2011. p. 1. <http://www.pre.ethz.ch/research/projects/imgs/solarhydro_1.jpg>.
"The Carbon Cycle : Feature Articles." NASA Earth Observatory : Home. Web. Accessed: Jul. 1, 2010. Printed: Jun. 13, 2011. 12 Pages. <http://earthobservatory.nasa.gov/Features/CarbonCycle>.
"The Solar Zinc Route." Digital image. Swiss Federal Institute of Technology, Department of Mechanical and Process Engineering, Zurich. Accessed: Jan. 4, 2011. Printed: May 20, 2011. <http://www.pre.ethz.ch/research/projects/imgs/solzinc_1.jpg>. p. 1.
"Zinc Zinc-oxide Thermochemical Cycle." Digital image. Wikipedia, the Free Encyclopedia, Published: Dec. 21, 2008. Accessed: Jan. 4, 2011. Printed: May 20, 2011. <http://en.wikipedia.org/wiki/File:Zinc_zinc-oxide_thermochemical_cycle.jpg>. p. 1.
Chen et al. "Parylene-Encapsulated Copolymeric Membranes as Localized and Sustained Drug Delivery Platforms." Annals of Biomedical Engineering, vol. 37, Issue 10 (Oct. 2009): pp. 2003-2017.
Chen et al. "Thermochemistry Concept Map." Teacherknowledge Wikispace, Published: Nov. 20, 2006. <http://teacherknowledge.wikispaces.com/file/view/Thermochemistry+concept+map+-+Extended.pdf>. p. 1.
Food and Agriculture Organization of the United Nations. "Carbon Sequestration Options under the Clean Development Mechanism to Address Land Degradation." World Soil Resources Reports. Rome, 2000. pp. 1-45.

(56) References Cited

OTHER PUBLICATIONS

Foust et al. "An Economic and Environmental Comparison of a Biochemical and a Thermochemical Lignocellulosic Ethanol Conversion Processes." Cellulose, vol. 16, Issue 4. Jun. 10, 2009. pp. 547-565.

Funk, James E. "Thermochemical Processes for the Production of Hydrogen from Water." College of Engineering, University of Kentucky, Lexington, Kentucky. 1975. pp. 1-9.

Hackett et al. "Evaluation of Conversion Technoloigy Processes and Products: Appendix A—Discussion of Thermochemical Process Definitions." University of California, Davis. Sep. 2004. pp. 1-7.

Kasting, James F. "The Carbon Cycle, Climate, and the Long-Term Effects of Fossil Fuel Burning." U.S. Global Change Research Information Office. 1998. Web. Accessed: Jul. 1, 2010. Printed: Jun. 13, 2011. <http://www.gcrio.org/CONSEQUENCES/vol4no1/carbcycle.html>.

U.S. Energy Information Administration."Greenhouse Gases—Energy Explained, Your Guide to Understanding Energy." Web. Accessed: Jul. 1, 2010. Printed: Jun. 13, 2011. 1 Pages. <http://www.eia.gov/energyexplained/index.cfm?page=environment_about_ghg>.

US Environmental Protection Agency. "Cap and Trade." Web. Accessed: Jul. 1, 2010. Printed: Jun. 13, 2011. <http://www.epa.gov/captrade/>.

US Environmental Protection Agency. "Carbon Dioxide—Geologic Sequestration | Climate Change—Greenhouse Gas Emissions | U.S. EPA." Web. Accessed: Jul. 1, 2010. Printed: Jun. 13, 2011. <http://www.epa.gov/climatechange/emissions/co2_geosequest.html>.

US Environmental Protection Agency. "Carbon Dioxide | Climate Change—Greenhouse Gas Emissions | U.S. EPA". Web. Accessed: Jul. 1, 2010. Printed: Jun. 13, 2011. 1 Page. <http://www.epa.gov/climatechange/emissions/co2.html>.

US Environmental Protection Agency. "EPA Preliminary Analysis of the Waxman-Markey Discussion Draft". Web. Accessed: Jul. 1, 2010. Printed: Jun. 13, 2011. <http://www.epa.gov/climatechange/economics/pdfs/WM-Analysis.pdf>.

Solar Collectors, Energy Storage, and Materials, pp. 443-444 (DeWinter, Francis, 1991).

Wikipedia > Aerogel > Carbon—"Carbon aerogels are also extremely 'black' in the infrared spectrum, reflecting only 0.3% of radiation between 250 nm and 14.3 μm, making them efficient for solar energy collectors," 1 page.

Vegners, Raimonds Maris; "Collodial Carbon and Silica : Their Use in Solar Energy" Table of Contents and Introduction of Thesis, University of Sydney, Feb. 1985, 5 pages.

Japanese Official Notice of rejection for Japanese Patent Application No. 2012-553089; Date of Mailing; Jan. 22, 2013; 9 pages.

N. Muradov: "Catalysis of Methane decomposition over elemental carbon", Catalysis Communications, No. 3-4, Jul. 1, 2001, pp. 89-94, p. 89, right-hand column, paragraph 2.

Muradov et al: "Catalytic Dissociation of Hydrocarbons: a Route to CO2-free Hydrogen", 15th Annual Symposium on Catalysis in Petroleum Refining & Petrochemicals.

* cited by examiner

CHEMICAL PROCESSES AND REACTORS FOR EFFICIENTLY PRODUCING HYDROGEN FUELS AND STRUCTURAL MATERIALS, AND ASSOCIATED SYSTEMS AND METHODS

CROSS-REFERENCE TO RELATED APPLICATIONS

The present application is a continuation of U.S. patent application Ser. No. 13/027,208, filed Feb. 14, 2011 and titled CHEMICAL PROCESSES AND REACTORS FOR EFFICIENTLY PRODUCING HYDROGENT FUELS AND STRUCTURAL MATERIALS, AND ASSOCIATED SYSTEMS AND METHODS, which claims priority to and the benefit of U.S. Patent Application No. 61/304,403, filed on Feb. 13, 2010 and titled FULL SPECTRUM ENERGY AND RESOURCE INDEPENDENCE. The present application is a continuation in part of U.S. patent application Ser. No. 12/804,509, filed on Jul. 21, 2010 and titled METHOD AND SYSTEM OF THERMOCHEMICAL REGENERATION TO PROVIDE OXYGENATED FUEL, FOR EXAMPLE, WITH FUEL-COOLED FUEL INJECTORS, which claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; PCT Application No. PCT/US09/67044, filed Dec. 7, 2009 and titled INTEGRATED FUEL INJECTORS AND IGNITERS AND ASSOCIATED METHODS OF USE AND MANUFACTURE; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. U.S. patent application Ser. No. 12/804,509 is also a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. U.S. patent application Ser. No. 12/804,509 is also a continuation-in-part of U.S. patent application Ser. No. 12/581,825, filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety. To the extent the foregoing application and/or any other materials incorporated herein by reference conflict with the disclosure presented herein, the disclosure herein controls.

TECHNICAL FIELD

The present application is directed generally to chemical processes and reactors for efficiently producing hydrogen fuels and structural materials, and associated systems and methods. In particular embodiments, such processes can be used to produce clean-burning, hydrogen-based fuels from a wide variety of feedstocks, and can produce structural building blocks from carbon and/or other elements that are released when forming the hydrogen-based fuels.

BACKGROUND

Renewable energy sources such as solar, wind, wave, falling water, and biomass-based sources have tremendous potential as significant energy sources, but currently suffer from a variety of problems that prohibit widespread adoption. For example, using renewable energy sources in the production of electricity is dependent on the availability of the sources, which can be intermittent. Solar energy is limited by the sun's availability (i.e., daytime only), wind energy is limited by the variability of wind, falling water energy is limited by droughts, and biomass energy is limited by seasonal variances, among other things. As a result of these and other factors, much of the energy from renewable sources, captured or not captured, tends to be wasted.

The foregoing inefficiencies associated with capturing and saving energy limit the growth of renewable energy sources into viable energy providers for many regions of the world, because they often lead to high costs of producing energy. Thus, the world continues to rely on oil and other fossil fuels as major energy sources because, at least in part, government subsidies and other programs supporting technology developments associated with fossil fuels make it deceptively convenient and seemingly inexpensive to use such fuels. At the same time, the replacement cost for the expended resources, and the costs of environment degradation, health impacts, and other by-products of fossil fuel use are not included in the purchase price of the energy resulting from these fuels.

In light of the foregoing and other drawbacks currently associated with sustainably producing renewable resources, there remains a need for improving the efficiencies and commercial viabilities of producing products and fuels with such resources.

DETAILED DESCRIPTION

Overview

Figure 1:
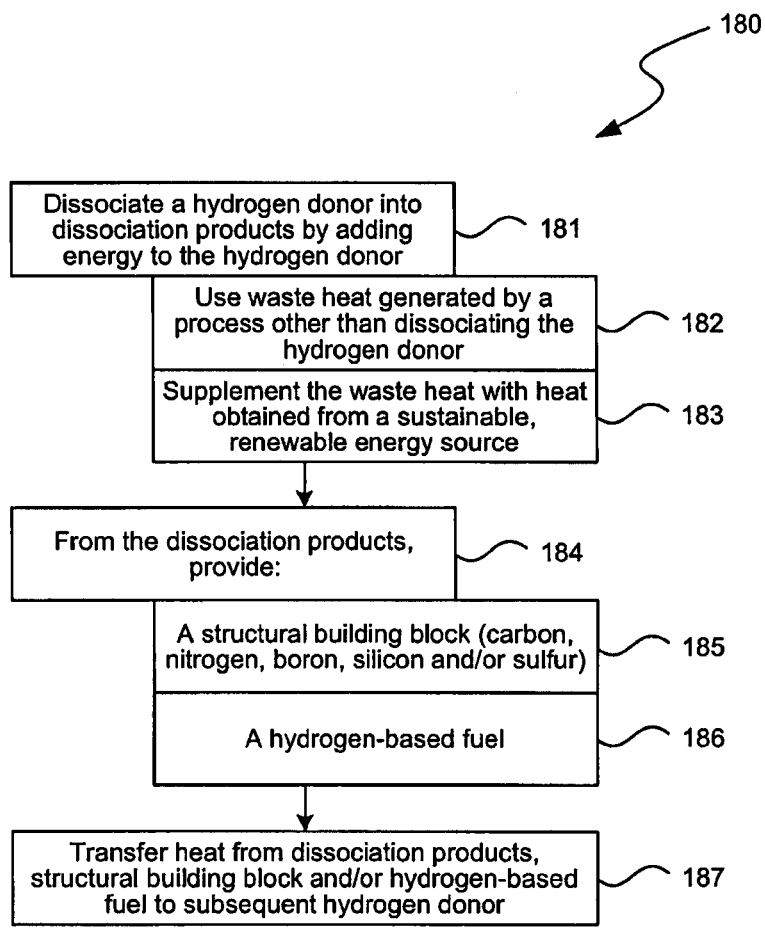
FIG. 1 is a flow diagram illustrating a process for efficiently producing hydrogen-based fuels and constituents for building durable goods in accordance with an embodiment of the presently disclosed technology.

Several examples of devices, systems and methods for efficiently producing hydrogen fuels and structural materials are described below. The efficiencies can result from using waste heat produced by other processes, renewable energy sources, and/or internal heat exchangers (e.g., counterflow or counter-current heat exchangers). The processes can produce clean-burning fuel and can re-purpose carbon and/or other constituents for use in durable goods, including polymers and carbon composites. Although the following description provides many specific details of the following examples in a manner sufficient to enable a person skilled in the relevant art to practice, make and use them, several of the details and advantages described below may not be necessary to practice certain examples of the technology. Additionally, the technology may include other examples that are within the scope of the claims but are not described here in detail.

References throughout this specification to "one example," "an example," "one embodiment" or "an embodiment" mean that a particular feature, structure, process or characteristic described in connection with the example is included in at least one example of the present technology. Thus, the occurrences of the phrases "in one example," "in an example," "one embodiment" or "an embodiment" in various places throughout this specification are not necessarily all referring to the same example. Furthermore, the particular features, structures, routines, steps or characteristics may be combined in any suitable manner in one or more examples of the technology. The headings provided herein are for convenience only and are not intended to limit or interpret the scope or meaning of the claimed technology.

Certain embodiments of the technology described below may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein refer to any data processor and can include internet appliances, hand-held devices, multi-processor systems, programmable consumer electronics, network computers, mini-computers, and the like. The technology can also be practiced in distributed environments where tasks or modules are performed by remote processing devices that are linked through a communications network. Aspects of the technology described below may be stored or distributed on computer-readable media, including magnetic or optically readable or removable computer discs as well as media distributed electronically over networks. In particular embodiments, data structures and transmissions of data particular to aspects of the technology are also encompassed within the scope of the present technology. The present technology encompasses both methods of programming computer-readable media to perform particular steps, as well as executing the steps.

A method in accordance with a particular embodiment includes dissociating a hydrogen donor into dissociation products by adding energy to the hydrogen donor, with the energy including waste heat generated by a process other than dissociating the hydrogen donor. For example, the waste heat can be obtained from the products of a combustion process. The method can further include providing a hydrogen-based fuel and/or a structural building block that includes carbon, nitrogen, boron, silicon, sulfur, and/or a transition metal. The structural building block and the hydrogen-based fuel are provided from the dissociation products, and in particular embodiments, are formed from the dissociation products.

A method in accordance with another embodiment of the technology includes dissociating a first hydrogen donor mass into first dissociation products and, from the first dissociation products, providing a hydrogen-based fuel and/or a structural building block based on carbon, nitrogen, boron, silicon, sulfur, and/or a transition metal. The method can further include transferring heat from the structural building block, the dissociation products, and/or the hydrogen-based fuel to a second hydrogen donor mass, and dissociating the second hydrogen donor mass into second dissociation products. Transferring heat from the process of dissociating the first hydrogen donor to the process of dissociating the second hydrogen donor can reduce the amount of energy required to dissociate the second hydrogen donor and can accordingly improve the overall efficiency of the process.

Figure 2:
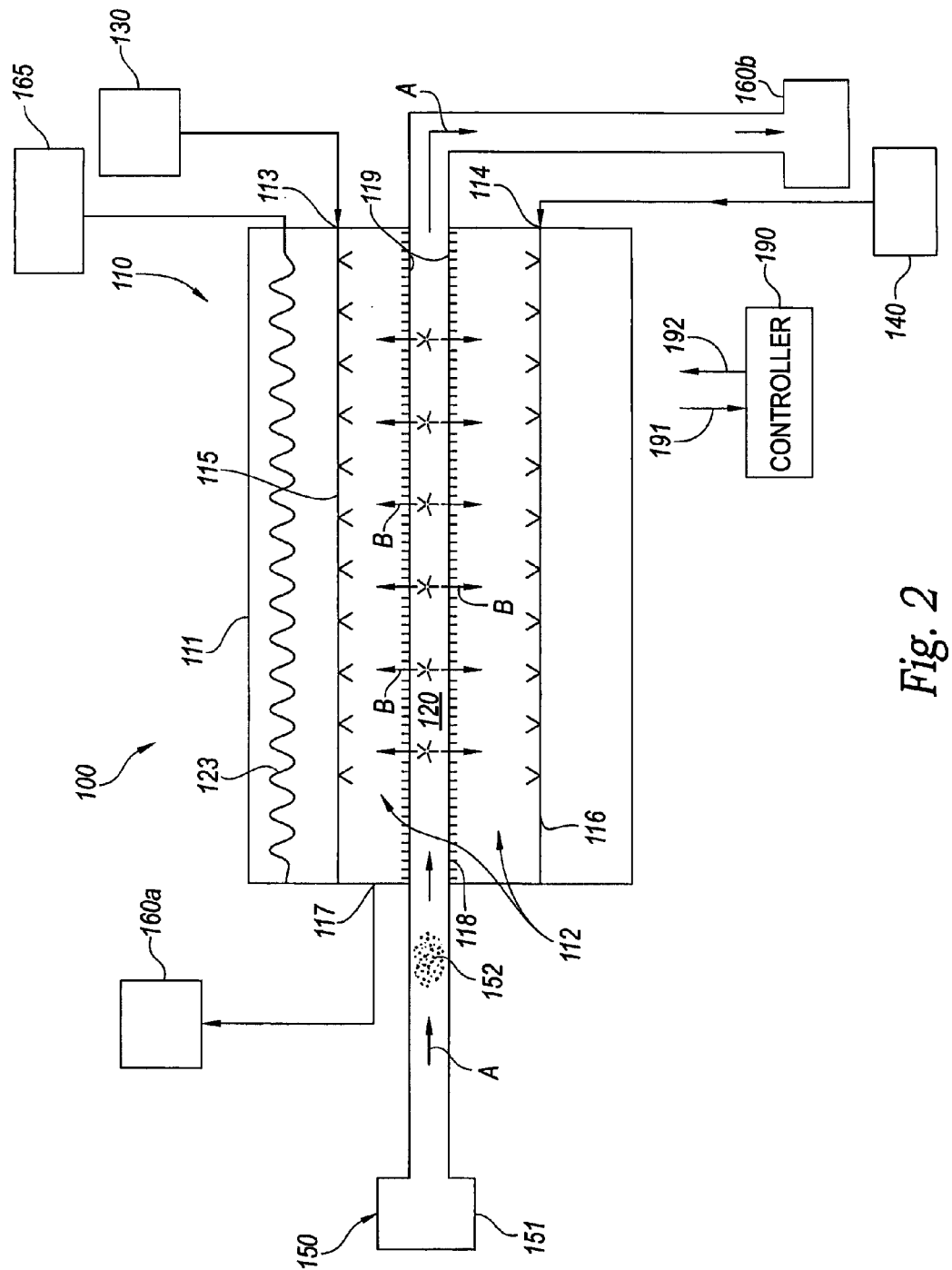
FIG. 2 is a partially schematic, partially cross-sectional illustration of a system that receives energy from waste heat and/or renewable energy sources in accordance with an embodiment of the presently disclosed technology.
Figure 3:
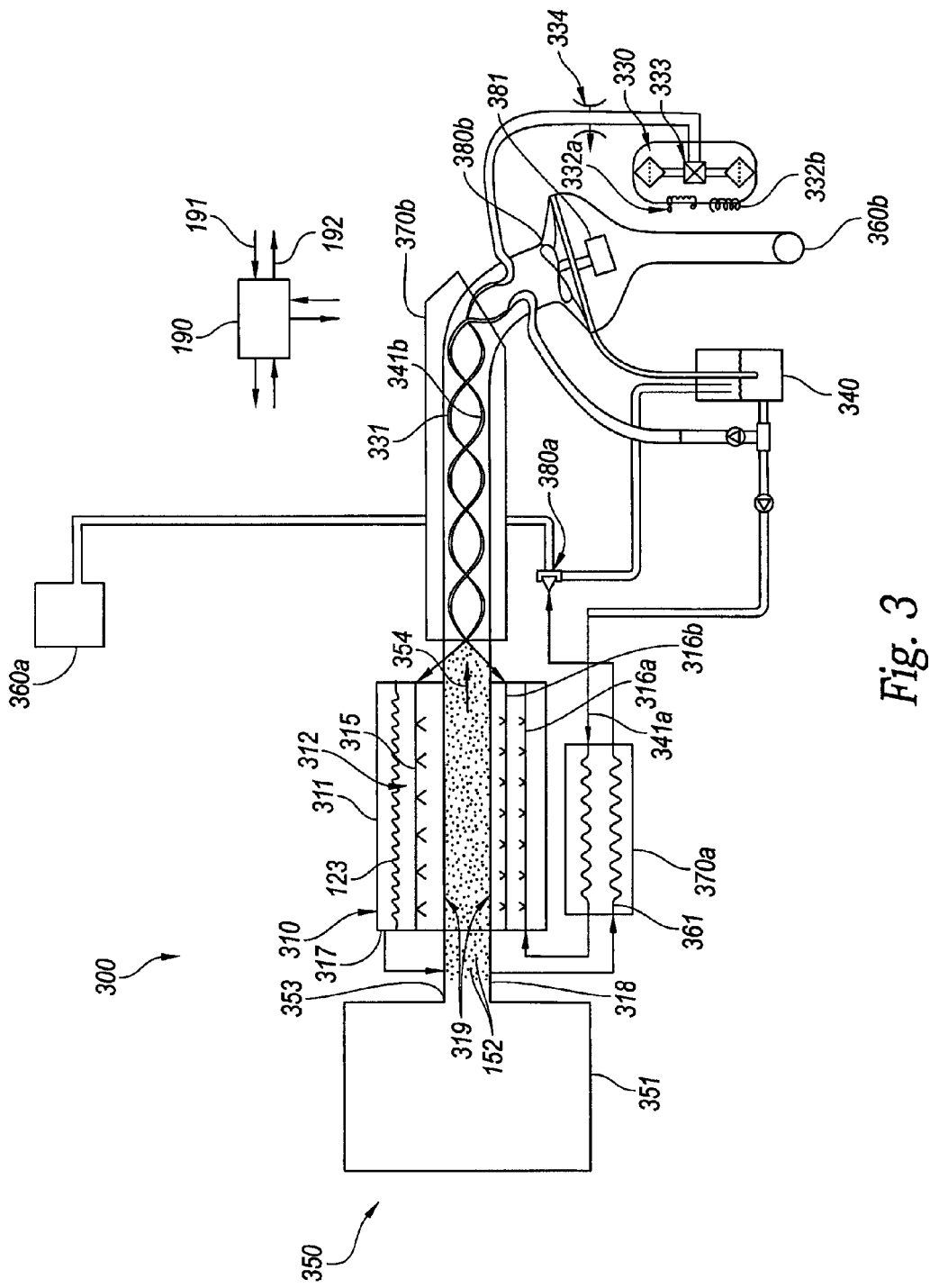
FIG. 3 is a partially schematic illustration of a system that includes a reactor in combination with counter-flow heat exchangers in accordance with an embodiment of the presently disclosed technology.

FIG. 1 is a flow diagram illustrating a representative process in accordance with several embodiments of the present technology. FIGS. 2 and 3 illustrate representative reactors in which such processes can be conducted, and FIGS. 4-9 illustrate architectural constructs that can be formed using the methods described herein.

Representative Processes

FIG. 1 is a flow diagram illustrating a chemical process 180 for forming hydrogen-based fuels and constituents (e.g., architectural constructs) for forming durable goods in accordance with an embodiment of the present technology. Process portion 181 includes dissociating a hydrogen donor into dissociation products by adding energy to the hydrogen donor. In many instances, the hydrogen donor includes a hydrocarbon, but in other embodiments, the hydrogen donor can include carbon-based compounds other than hydrocarbon fuels (e.g., carbohydrates, alcohols, esters, cellulose and/or others). In still further embodiments, the hydrogen donor can include hydrogen atoms in combination with elements other than carbon. For example, nitrogenous compounds (e.g., ammonia and/or urea) can serve a similar function. In any of these embodiments, the energy added to the hydrogen donor to produce the dissociation products can be obtained from waste heat generated by a process other than dissociating the hydrogen donor (process portion 182). For example, process portion 182 can include re-using waste heat from an internal combustion engine or other engine to drive the process of dissociating the hydrogen donor. In other embodiments, the heat can be obtained from fuel cells, regenerative braking or other sources. In general, the heat is available at a temperature high enough to readily transfer to a process or reaction zone, or, in cases of lower grade heat, the heat can be converted to a higher temperature output via another process.

In at least some of the foregoing embodiments, the waste heat identified in process portion 182 may be insufficient by itself to carry out the chemical dissociation identified in process portion 181. Accordingly, process portion 183 includes supplementing the waste heat with heat that is obtained from a sustainable, renewable energy source, if possible. As used herein, the terms "sustainable" and "renewable" in the context of energy sources refer generally to sources that do not require rapidly depleting energy stores that take a significantly longer time to replace. For example, these terms can include solar energy, wave energy, wind energy, geothermal energy, tidal energy, and falling water energy, but do not include fossil fuel energy.

Process portion 184 includes providing useful end products from the dissociation products formed in process portion 181. The end products can include a structural building block (as identified in process portion 185) and/or a hydrogen-based fuel (as identified in process portion 186). The structural building block includes compositions that may be further processed to produce architectural constructs. For example, the structural building blocks can include compounds or molecules resulting from the dissociation process and can include carbon, boron, nitrogen, silicon, sulfur, and/or transition metals. In general, the building block element does not include hydrogen. In a specific example, methane is dissociated to form hydrogen and carbon dioxide or carbon monoxide (structural building blocks). The carbon dioxide and/or carbon monoxide can be further processed to form polymers, graphene, carbon fiber, and/or another architectural construct. The architectural construct can include a self-organized structure (e.g., a crystal) formed from any of a variety of suitable elements, including the elements described above (carbon, nitrogen, boron, silicon, sulfur, and/or transition metals). In any of these embodiments, the architectural construct can form durable goods, e.g., graphene or carbon composites, and/or other structures described further with reference to FIGS. 4-9. In other embodiments, the structural building blocks can form polymer films or other durable goods.

The hydrogen-based fuel identified in process portion 186 can include diatomic hydrogen, or a hydrogen compound that is suitable for use as a fuel. In general, the hydrogen-based fuel will have a higher energy and/or provide improved combustion characteristics and/or prevent or reduce pollution, when compared to the hydrogen donor from which it is formed. For example, the hydrogen-based fuel can have a greater dissociation energy than the dissociation energy of the hydrogen donor, by virtue of the energy added to the constituents of the hydrogen-based fuel during dissociation (and in at least some cases), subsequent processes. Process portion 187 includes transferring heat from the dissociation products, the structural building block, and/or the hydrogen-based fuel to a subsequent hydrogen donor. For example, process portion 187 can include transferring heat from hot dissociation products (which were heated in an endothermic dissociation process) to an incoming mass or volume of a hydrogen donor. This arrangement of counter-current or counter-flow heat exchange makes use of heat which would otherwise be wasted when the relevant constituent is cooled for subsequent use, and accordingly improves the overall efficiency of the process. In particular embodiments, the process can include extracting work from the thermal and/or pressure potential energy of the dissociation products, the structural building block, and/or the hydrogen-based fuel prior to removing additional heat from these constituents for any of a variety of purposes including storage. The work can be performed by a turbine, heat engine, fuel cell or other suitable device.

In particular embodiments, the hydrogen donor identified in process portion 181 can include methane. The methane itself can be obtained from a variety of suitable sources. In at least some embodiments, the sources include renewable sources, for example, methane obtained from the anaerobic digestion of a renewable biomass, or from landfills. Equations 1-4, identified below, depict endothermic reactions in which methane is dissociated to form hydrogen and carbon or a carbon compound.

$$CH_4 + HEAT_1 \rightarrow C + 2H_2 \qquad \text{Equation 1}$$

$$CH_4 + H_2O + HEAT_2 \rightarrow CO + 3H_2 \qquad \text{Equation 2}$$

$$CH_4 + CO_2 + HEAT_3 \rightarrow 2CO + 2H_2 \qquad \text{Equation 3}$$

$$C_6H_{10}O_5 + HEAT_4 \rightarrow CH_3OH + 4CO + 3H_2 + C \qquad \text{Equation 4}$$

In particular embodiments, the forgoing endothermic reactions may be used in conjunction with an exothermic reaction to further process the hydrogen-based fuel. For example, Equation 5 below represents an exothermic reaction that uses the dissociation products of Equation 2 or Equation 3 to form methanol.

$$2CO + 2H_2 \rightarrow CH_3OH + HEAT \qquad \text{Equation 5}$$

In some instances, it is beneficial to produce methanol rather than diatomic hydrogen due to its enhanced versatility as a fuel, and the ability to store methanol in existing tanks currently used for liquid hydrocarbon fuels. Further details of combined exothermic and endothermic reactions and the associated heat exchange processes that can be exploited with such combinations are disclosed in co-pending U.S. application Ser. No. 13/027,060 titled "REACTOR VESSELS WITH PRESSURE AND HEAT TRANSFER FEATURES FOR PRODUCING HYDROGEN-BASED FUELS AND STRUCTURAL ELEMENTS, AND ASSOCIATED SYSTEMS AND METHODS" filed concurrently herewith and incorporated herein by reference.

Equation 6 below characterizes another methane conversion process that produces an alkene, e.g., ethylene or ethene.

$$CH_4 + C \rightarrow C_2H_4 \qquad \text{Equation 6}$$

Ethene has widespread industrial and plant hormone applications. One aspect of the process represented by Equation 6 is that it may not include a hydrogen-based fuel as a product (e.g., unless the ethene is further processed to produce such a fuel). Accordingly, reactions in accordance with the present technology can produce architectural constructs, hydrogen-based fuels, or both.

In still further embodiments, the hydrogen donor can include elements other than carbon, e.g., nitrogen, as indicated by Equations 7 and 8 below.

$$2NH_3 + HEAT_7 \rightarrow N_2 + 3H_2 \qquad \text{Equation 7}$$

$$NH_3OH + C_xH_yO_z + HEAT_8 \rightarrow CO + N_2 + H_2 \qquad \text{Equation 8}$$

The $C_xH_yO_z$ constituent can be provided by graphene or another architectural construct loaded with hydrogen.

The foregoing processes can be conducted in an autogenous manner. In particular, the carbon, nitrogen, and/or other constituents resulting from producing the hydrogen-based fuel can be controlled and reinvested in useful end products, rather than being released into the environment where they can accumulate to toxic levels. The result of this type of cycle can mimic naturally occurring carbon and nitrogen cycles. It is expected that implementing such cycles can result in a higher carrying capacity of the earth (e.g., a higher capacity for human population) without a decrease in the quality of living and in fact, with an expected increase in the quality of living. Accordingly, processes that deplete finite resources, toxify the environment, and/or waste or fail to reinvest or utilize output products are not considered autogenous. One aspect of the presently disclosed technology is to make forming hydrogen-based fuels more autogenous.

Representative Reactors

The foregoing reactions may be conducted in a wide variety of reactors described in several co-pending patent applications assigned to the assignee of the present application. Aspects of a representative reactor are described in general terms with respect to FIGS. 2 and 3 below, and are disclosed in greater detail in co-pending U.S. patent application Ser. No. 13/026,996 titled "REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS" filed concurrently herewith and incorporated herein by reference.

FIG. 2 is a partially schematic illustration of a representative system 100 that includes a reactor 110. The reactor 110 further includes a reactor vessel 111 that encloses or partially encloses a reaction zone 112. In at least some instances, the reactor vessel 111 has one or more transmissive surfaces positioned to facilitate the chemical reaction taking place within the reaction zone 112. In a representative example, the reactor vessel 111 receives a hydrogen donor provided by a donor source 130 to a donor entry port 113. For example, the hydrogen donor can include methane or another hydrocarbon. A donor distributor or manifold 115 within the reactor vessel 111 disperses or distributes the hydrogen donor into the reaction zone 112. The reactor vessel 111 also receives steam from a steam/water source 140 via a steam entry port 114. A steam distributor 116 in the reactor vessel 111 distributes the steam into the reaction zone 112. The reactor vessel 111 can further include a heater 123 that supplies heat to the reaction zone 112 to facilitate endothermic reactions. The power for the heater (e.g., electrical power) can be provided by a renewable energy source 165. As described above, the renewable energy source 165 can include a solar, wind, water and/or other suitable sustainable sources. The reactions performed at the reaction zone 112 can include dissociating methane or another hydrocarbon into hydrogen or a hydrogen compound, and carbon or a carbon compound, (as discussed above with reference to Equations 1-6), or nitrogen or a nitrogen compound (as discussed above with reference to Equations 7-8). The products of the reaction exit the reactor vessel 111 via an exit port 117 and are collected at a reaction product collector 160a.

The system 100 can further include a source 150 of radiant energy (e.g., waste heat) and/or additional reactants, which provides constituents to a passage 118 within the reactor vessel 111. For example, the heat/reactant source 150 can include a combustion chamber 151 that provides hot combustion products 152 to the passage 118, as indicated by arrow A. The combustion products 152 and associated waste heat are produced by a process separate from the dissociation process (e.g., a power generation process). A combustion products collector 160b collects combustion products exiting the reactor vessel 111 for further recycling and/or other uses. In a particular embodiment, the combustion products 152 can include hot carbon dioxide, carbon monoxide, water vapor, and/or other constituents. One or more transmissive surfaces 119 are positioned between the reaction zone 112 (which can be disposed annularly around the passage 118) and an interior region 120 of the passage 118. The transmissive surface 119 can accordingly allow radiant energy and/or a chemical constituent to pass radially outwardly from the passage 118 into the reaction zone 112, as indicated by arrows B. By delivering the radiant energy (e.g., heat) and/or chemical constituent(s) provided by the flow of combustion products 152, the system 100 can enhance the reaction taking place in the reaction zone 112, for example, by increasing the reaction zone temperature and/or pressure, and therefore the reaction rate, and/or the thermodynamic efficiency of the reaction. The foregoing process can accordingly recycle or reuse energy and/or constituents that would otherwise be wasted, in addition to facilitating the reaction at the reaction zone 112.

The composition and structure of the transmissive surface 119 can be selected to allow radiant energy to readily pass from the interior region 120 of the passage 118 to the reaction zone 112. Accordingly, the transmissive surface 119 can include glass, graphene, or a re-radiative component. Suitable re-radiative components are described further in co-pending U.S. application Ser. No. 13/027,015 titled "CHEMICAL REACTORS WITH RE-RADIATING SURFACES AND ASSOCIATED SYSTEMS AND METHODS", filed concurrently herewith and incorporated herein by reference.

As noted above, the combustion products 152 can include steam and/or other constituents that may serve as reactants in the reaction zone 112. Accordingly, the transmissive surface 119 can be manufactured to selectively allow such constituents into the reaction zone 112, in addition to or in lieu of admitting radiant energy into the reaction zone 112. In a particular embodiment, the transmissive surface 119 can be formed from a carbon crystal structure, for example, a layered graphene structure. The carbon-based crystal structure can include spacings (e.g., between parallel layers oriented transverse to the flow direction A) that are deliberately selected to allow water molecules to pass through as a result of a pressure, temperature, impedance, and/or concentration gradient. At the same time, the spacings can be selected to prevent useful reaction products produced in the reaction zone 112 from passing out of the reaction zone. Accordingly, the transmissive surface 119 can be formed by using the same type of architectural constructs produced directly or indirectly by processes conducted in the reactor 110. This loop represents one example of an autogenous cycle in which a process is used to form a product that increases the efficiency of the process.

The system 100 can further include a controller 190 that receives input signals 191 (e.g., from sensors) and provides output signals 192 (e.g., control instructions) based at least in part on the inputs 191. Accordingly, the controller 190 can include suitable processor, memory and I/O capabilities. The controller 190 can receive signals corresponding to measured or sensed pressures, temperatures, flow rates, chemical concentrations and/or other suitable parameters, and can issue instructions controlling reactant delivery rates, pressures and temperatures, heater activation, valve settings and/or other suitable actively controllable parameters. An operator can provide additional inputs to modify, adjust and/or override the instructions carried out autonomously by the controller 190.

FIG. 3 is a partially schematic illustration of system 300 that includes a reactor 310 in combination with heat exchangers and separators configured to transfer heat and segregate reaction products in accordance with another embodiment of the disclosure. In a particular aspect of this embodiment, the system 300 includes a steam/water source 340 that provides steam to a reactor vessel 311 to facilitate product formation. Steam from the steam/water source 340 can be provided to the reactor 310 via one or more channels. In a particular embodiment, a first channel includes a first water path 341a that passes through a first heat exchanger 370a and into the reactor vessel 311 via a first steam distributor 316a. Products removed from the reactor vessel 311 pass through a reactor product exit port 317 and along a products path 361. The products path 361 passes through the first heat exchanger 370a in a counter-flow or counter-current manner to cool the products and heat the steam entering the reactor vessel 311.

The products continue to a reaction product separator 380a that segregates useful end products (e.g., hydrogen and carbon or carbon compounds) which are then collected at a products collector 360a. Water remaining in the products path 361 can be separated at the reaction product separator 380a and returned to the steam/water source 340.

A second channel via which the steam/water source 340 provides steam to the reactor 310 includes a second water path 341b that passes through a second heat exchanger 370b. Water proceeding along the second water path 341b enters the reactor 310 in the form of steam via a second stream distributor 316b. This water is heated by combustion products that have exited a radiant energy/reactant source 350 (e.g., exited a combustion chamber 351 at a combustion products outlet 353), and passed through the combustion product passage 318 (which includes a transmissive surface 319) along a combustion products path 354. The spent combustion products are collected at a combustion products collector 360b and can include nitrogen compounds, phosphates, used illuminant additives (e.g., sources of sodium, magnesium and/or potassium), and/or other compositions that may be recycled or used for other purposes (e.g., agricultural purposes.)

In addition to heating water along the second water path 341b and cooling the combustion products along the combustion products path 354, the second heat exchanger 370b can heat the hydrogen donor passing along a donor path 331 to a donor distributor 315 located within the reactor vessel 311. In particular, the system 300 can include a donor vessel 330 that houses a hydrogen donor, e.g., a hydrocarbon such as methane, or a nitrogenous donor such as ammonia. The donor vessel 330 can include one or more heaters 332 (shown as first heater 332a and a second heater 332b) to vaporize and/or pressurize the hydrogen donor within. A three-way valve 333 and a regulator 334 control the amount of fluid and/or vapor that exits the donor vessel 330 and passes along the donor path 331 through the second heat exchanger 370b and into the reactor vessel 311.

In the reactor vessel 311, the combustion products 152 pass through the combustion products passage 318 while delivering radiant energy and/or reactants through the transmissive surface 319 into the reaction zone 312. After passing through the second heat exchanger 370b, the combustion products 152 can enter a combustion products separator 380b that separates water from the combustion products. The water returns to the steam/water source 340 and the remaining combustion products are collected at a combustion products collector 360b. In a particular embodiment, the separator 380b can include a centrifugal separator that is driven by the kinetic energy of the combustion product stream. If the kinetic energy of the combustion product stream is insufficient to separate the water by centrifugal force, a motor/generator 381 can add energy to the separator 380b to provide the necessary centrifugal force. If the kinetic energy of the combustion product stream is greater than is necessary to separate water, the motor/generator 381 can produce energy, e.g., to be used by other components of the system 300. The controller 190 receives inputs from the various elements of the system 300 and controls flow rates, pressures, temperatures, and/or other parameters.

One feature of at least some of the foregoing embodiments is that the reactor system can include internal heat exchangers that reduce internal losses by recycling heat. For example, such heat exchangers can be used to cool the combustion products and/or chemical reaction products, while heating the reaction zone, incoming steam, and/or other incoming chemical reactants. This arrangement can improve the efficiency with which hydrogen-based fuels and architectural constructs are formed, thus improving the cost-competitive position of these products.

Representative Architectural Constructs

The process 180 described above with reference to FIG. 1 can produce architectural constructs (or associated structural building block precursors) in addition to or in lieu of producing hydrogen-based fuels. Architectural constructs include configurable building block structures that are formed to exhibit useful properties. Architectural constructs can include a synthetic matrix and/or other self-organizing structure or arrangement of crystals. The construct can be carbon-based (e.g., in the case of graphene or graphite), or based on other elements or components (e.g., boron, nitrogen, or boron nitride). The construct can be configured as a solid mass, as layers that are as thin as an atom, or in other arrangements and variations. The configuration of the construct is largely responsible for determining its behavior under a variety of conditions. As a result, the architectural construct can be designed to perform highly specialized tasks in a wide range of applications. Five representative sets of properties are particularly amenable to technological uses: (i) thermal properties; (ii) electromagnetic, optical, and acoustic properties; (iii) catalytic properties; (iv) capillary properties; and (v) sorptive properties. Although they are grouped in the foregoing manner for purposes of discussion, properties from different categories are sometimes interrelated or associated with one another. Accordingly, an architectural construct can be configured to exhibit some or all of the properties discussed throughout this specification.

The behavior of the architectural construct depends on the composition, dopants, and coatings (including catalysts) that are applied to the construct. When configured as layers, the behavior of the construct also depends on the layer thickness, spacers between layers, the distances separating the layers, and the structures used to support and/or separate the layers. From a macroscopic standpoint, it can be configured to have a specific density, modulus of elasticity, and/or section modulus. From a microscopic standpoint, the construct can be designed to act as a molecular processor, charge processor, and/or bio processor.

Figure 4:
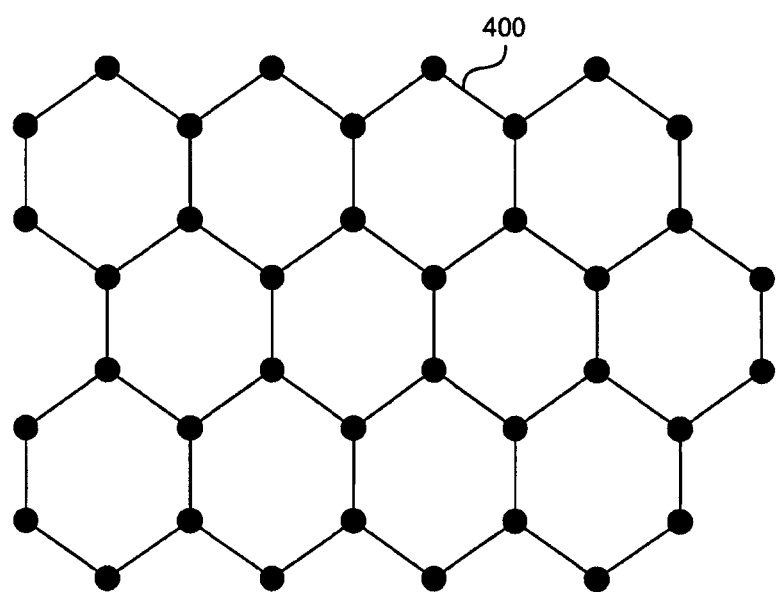
FIG. 4 is a diagram showing an architectural construct having a molecular structure in accordance with an embodiment of the presently disclosed technology.
Figure 5:
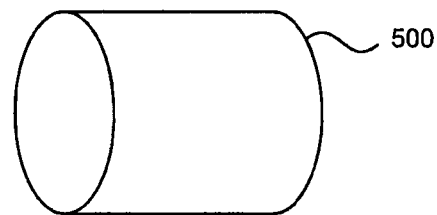
FIG. 5 an isometric view of an architectural construct configured as a solid mass in accordance with an embodiment of the presently disclosed technology.

FIGS. 4-9 illustrate representative architectural constructs. Further representative constructs are included in co-pending U.S. application Ser. No. 13/027,214 titled "ARCHITECTURAL CONSTRUCT HAVING FOR EXAMPLE A PLURALITY OF ARCHITECTURAL CRYSTALS", filed concurrently herewith and incorporated herein by reference. FIG. 4 shows a molecular, diagram of a layer 400 which can in turn form a matrix arrangement of crystals. The layer 400 can include graphene, which is an atom-thick planar sheet of carbon. FIG. 5 shows an isometric view of an architectural construct 500 that is configured as a solid mass. The architectural construct 500 can include, for example, graphite or boron nitride. Architectural constructs configured as a solid mass can include multiple, single-atom-thick layers stacked together. Representative architectural constructs configured as a solid mass are specialized, e.g., altered to behave in a specific way.

In some implementations, the solid mass is specialized by doping. For example, an architectural construct that includes graphene may have areas that are reacted with boron to form both stoichiometric and non-stoichiometric subsets. The graphene can be further combined with nitrogen and can include both graphene and boron nitride graphene with a nitrogen interface. In some implementations, compounds are built upon the architectural construct. For example, from a boron nitride interface, a designer can build magnesiumaluminum-boron compounds. By specializing an architectural construct in these ways, a designer can create a construct that exhibits different properties than would a construct composed of only one substance.

Figure 6:
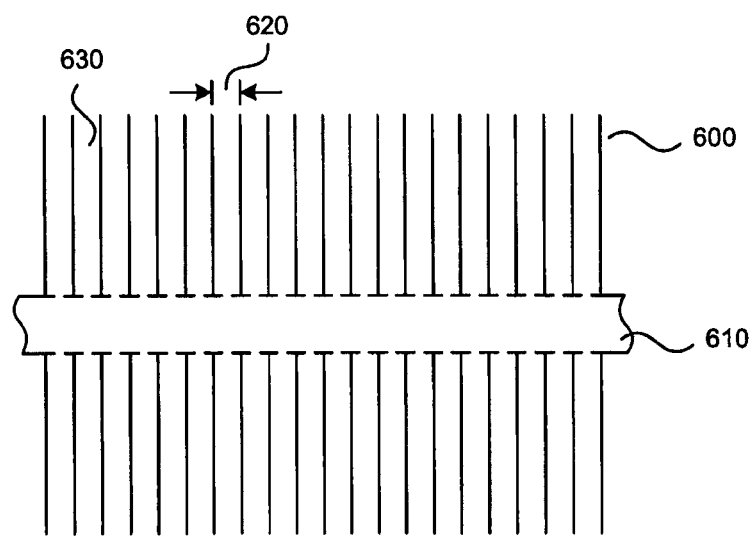
FIG. 6 is a cross-sectional side view of an architectural construct having parallel layers in accordance with an embodiment of the presently disclosed technology.

Although an atom-thick sheet and solid mass of crystals exhibit many of the properties discussed below, other configurations are capable of yielding a wider range of properties and achieving more useful outcomes. For example, FIG. 6 is a cross-sectional side view of an architectural construct 600 having parallel layers in accordance with an embodiment of the technology. Parallel layers of an architectural construct may be formed from any of a number of suitable substances, such as graphene, graphite, or boron nitride. Parallel layers may be rectangular, circular, or can have other shapes. In FIG. 6, the layers are circular and include a hole through which a support tube 610 supports the architectural construct 600. The layers are each separated by a distance 620, creating zones 630 between the layers.

Architectural constructs can be formed by machining a single crystal into a desired shape and exfoliating the single crystal into layers. U.S. Pat. No. 6,503,584 and pending U.S. patent application Ser. No. 12/857,515, filed on Aug. 16, 2010, entitled "APPARATUSES AND METHODS FOR STORING AND/OR FILTERING A SUBSTANCE," both of which are incorporated herein by reference, describe this and other approaches. In other embodiments the architectural constructs can be built up on a seed material, e.g., using an epitaxial growth process, as disclosed in co-pending U.S. application Ser. No. 13/027,198 titled "COUPLED THERMOCHEMICAL REACTORS AND ENGINES, AND ASSOCIATED SYSTEMS AND METHODS", filed concurrently herewith and incorporated herein by reference.

Figure 7:
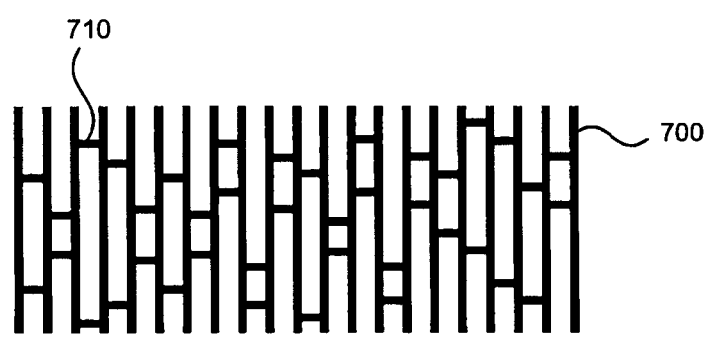
FIG. 7 is a side view of an architectural construct having interconnected parallel layers in accordance with an embodiment of the presently disclosed technology.

FIG. 7 is a side view of an architectural construct 700 that includes parallel layers that are each thicker than one atom. The layers can be supported relative to each other with intermittent spacers 710. The parallel layers can vary from only a few atoms thick to thicknesses of 20 atoms or more.

Figure 8:
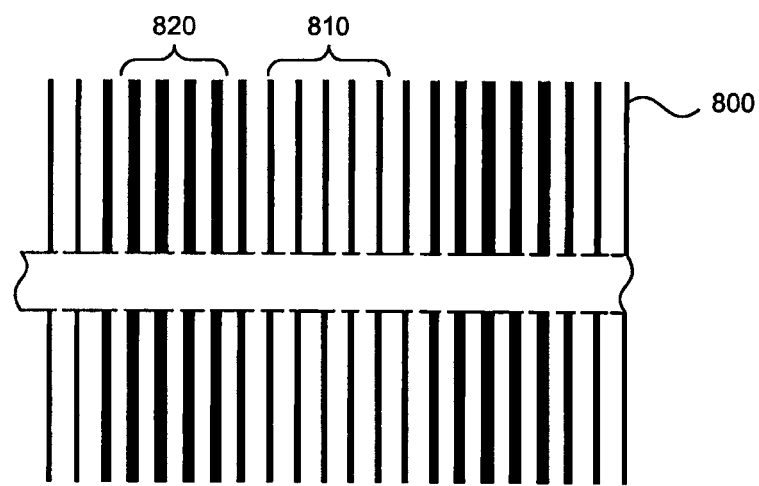
FIG. 8 is a cross-sectional side view of an architectural construct having parallel layers in accordance with an embodiment of the presently disclosed technology.

In some implementations, all of the layers have the same thickness, while in other implementations individual layers can have different thicknesses. FIG. 8 is a cross-sectional side view of an architectural construct 800 that has parallel layers with various different thicknesses. As discussed above, layers thicker than an atom or differing from each other in thicknesses may be exfoliated from a single crystal by controlling the depth that a fluid is diffused into the crystal to exfoliate the layers (e.g., by introducing impurities or dopants at the desired depth).

Architectural constructs can have parallel layers that are spaced an equal distance as shown in FIG. 6 or by unequal distances, as shown in FIG. 8. The distances between the layers of the architectural construct 800 vary in the arrangement shown in FIG. 8. For example, the distance between the layers of a first set 810 of layers is greater than the distance between the layers of a second set 820 of layers, meaning that the zones between layers of the first set 810 are larger than those of the second set 820.

Figure 9:
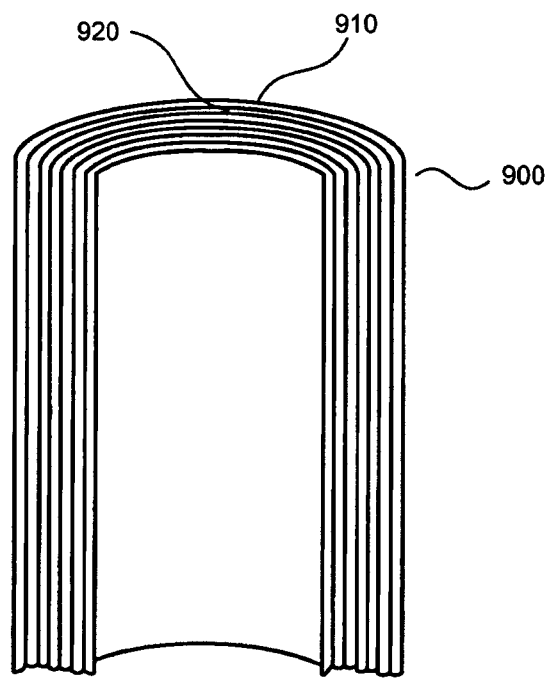
FIG. 9 is a cross-sectional side view of an architectural construct having concentric tubular layers in accordance with an embodiment of the presently disclosed technology.

FIG. 9 shows a cross-sectional side view of an architectural construct 900 consisting of concentric tubular layers of a matrix characterization of crystals. For example, a first layer 910 of the architectural construct is tubular and has a diameter greater than a second layer 920 of the architectural construct, and the second layer 620 is positioned within the first layer 910. An architectural construct consisting of concentric tubes can be formed in any of several suitable ways. One method, which is discussed generally in U.S. Pat. No. 6,503,584, is to dehydrogenate a gas (e.g., a hydrocarbon) within a frame to form the first layer 910 of the architectural construct 900, and to dehydrogenate a substance (e.g., titanium hydride) to form spacers on the inside surface of the first layer before dehydrogenating the gas to form the second layer 920 on the spacers. Subsequent layers can then be deposited in a similar fashion. In some implementations, each tubular layer is formed by dehydrogenating a gas in its own frame. The dehydrogenated layers are then configured within each other in the configuration shown in FIG. 9. Spacers can be deposited on either the inside or outside surfaces of the layers to space them apart by a particular distance.

One feature of the representative architectural constructs described above with reference to FIGS. 4-9 is that they can be formed using the carbon or other material resulting from dissociating a hydrogen donor molecule into products used for a hydrogen-based fuel. Accordingly, the process of forming the architectural constructs can be performed alongside and/or otherwise in conjunction with forming the hydrogen-based fuels. As described above with reference to FIG. 2, the architectural construct can be used to form components of a reactor that is in turn used to form more architectural constructs and hydrogen fuel. Other embodiments include other synergistic combinations of architectural constructs and hydrogen-based fuels. For example, carbon-based constructs including graphene can be packed with hydrogen (via adsorptive forces) and then formed into a powder that has a greater concentration of hydrogen atoms per unit volume than liquid hydrogen, and is simpler and more convenient to store. In another example, the hydrogen donor can include diesel fuel, and in the reaction, hydrogen that was previously dissociated from a hydrogen donor (diesel fuel or otherwise) can be added to the dissociation reaction to facilitate the dissociation reaction.

From the foregoing, it will appreciated that specific embodiments of the technology have been described herein for purposes of illustration, but that various modifications may be made without deviating from the technology. For example, certain embodiments of the processes described above were described in the context of methane. In other embodiments, other hydrocarbon fuels or non-carbon-containing hydrogen donors can undergo similar processes to form hydrogen-based fuels and architectural constructs. Other embodiments can use waste heat from sources other than combustion engines and/or can recycle heat internally or between sub-processes in manners other than those expressly described above.

Certain aspects of the technology described in the context of particular embodiments may be combined or eliminated in other embodiments. For example, certain embodiments were described above in the context of using waste heat as a source of energy for a dissociation process, as well as internal heat exchangers to conserve heat. In other embodiments, either one of the foregoing arrangements can be used individually. Further while advantages associated with certain embodiments of the technology have been described in the context of those embodiments, other embodiments may also exhibit such advantages, and not all embodiments need necessarily exhibit such advantages to fall within the scope of the present disclosure. Accordingly, the present disclosure and associated technology can encompass other embodiments not expressly shown or described herein.

To the extent not previously incorporated herein by reference, the present application incorporates by reference in their entirety the subject matter of each of the following materials: U.S. patent application Ser. No. 12/857,553, filed on Aug. 16, 2010 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES; U.S. patent application Ser. No. 12/857,553, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,502, filed on Aug. 16, 2010 and titled ENERGY SYSTEM FOR DWELLING SUPPORT; filed on Feb. 14, 2011 and titled DELIVERY SYSTEMS WITH IN-LINE SELECTIVE EXTRACTION DEVICES AND ASSOCIATED METHODS OF OPERATION; U.S. patent application Ser. No. 61/401,699, filed on Aug. 16, 2010 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES; filed on Feb. 14, 2011 and titled REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS; U.S. patent application Ser. No. 13/026,996, filed on Feb. 14, 2011 and titled CHEMICAL REACTORS WITH RE-RADIATING SURFACES AND ASSOCIATED SYSTEMS AND METHODS; , filed on Feb. 14, 2011 and titled THERMAL TRANSFER DEVICE AND ASSOCIATED SYSTEMS AND METHODS; U.S. patent application Ser. No. 13/027,015, filed on Feb. 14, 2011 and titled CHEMICAL REACTORS WITH ANNULARLY POSITIONED DELIVERY AND REMOVAL DEVICES, AND ASSOCIATED SYSTEMS AND METHODS; U.S. patent application Ser. No. 13/027,244, filed on Feb. 14, 2011 and titled REACTORS FOR CONDUCTING THERMOCHEMICAL PROCESSES WITH SOLAR HEAT INPUT, AND ASSOCIATED SYSTEMS AND METHODS; U.S. patent application Ser. No. 13/026,990, filed on Feb. 14, 2011 and titled INDUCTION FOR THERMOCHEMICAL PROCESS, AND ASSOCIATED SYSTEMS AND METHODS; U.S. patent application Ser. No. 13/027,181, filed on Feb. 14, 2011 and titled COUPLED THERMOCHEMICAL REACTORS AND ENGINES, AND ASSOCIATED SYSTEMS AND METHODS; U.S. patent application Ser. No. 61/385,508, filed on Sep. 22, 2010 and titled REDUCING AND HARVESTING DRAG ENERGY ON MOBILE ENGINES USING THERMAL CHEMICAL REGENERATION; filed on Feb. 14, 2011 and titled REACTOR VESSELS WITH PRESSURE AND HEAT TRANSFER FEATURES FOR PRODUCING HYDROGEN-BASED FUELS AND STRUCTURAL ELEMENTS, AND ASSOCIATED SYSTEMS AND METHODS; filed on Feb. 14, 2011 and titled ARCHITECTURAL CONSTRUCT HAVING FOR EXAMPLE A PLURALITY OF ARCHITECTURAL CRYSTALS; U.S. patent application Ser. No. 12/806,634, filed on Aug. 16, 2010 and titled METHODS AND APPARATUSES FOR DETECTION OF PROPERTIES OF FLUID CONVEYANCE SYSTEMS; filed on Feb. 14, 2011 and titled METHODS, DEVICES, AND SYSTEMS FOR DETECTING PROPERTIES OF TARGET SAMPLES; filed on Feb. 14, 2011 and titled SYSTEM FOR PROCESSING BIOMASS INTO HYDROCARBONS, ALCOHOL VAPORS, HYDROGEN, CARBON, ETC.; U.S. patent application Ser. No. 13/027,188, and titled CARBON RECYCLING AND REINVESTMENT USING THERMOCHEMICAL REGENERATION; U.S. patent application Ser. No. 13/027,196, filed on Feb. 14, 2011 and titled OXYGENATED FUEL; U.S. Patent Application No. 61/237,419, filed on Aug. 27, 2009 and titled CARBON SEQUESTRATION; U.S. Patent Application No. 61/237,425, filed on Aug. 27, 2009 and titled OXYGENATED FUEL PRODUCTION; filed on Feb. 14, 2011 and titled MULTI-PURPOSE RENEWABLE FUEL FOR ISOLATING CONTAMINANTS AND STORING ENERGY; U.S. Patent Application No. 61/421,189, filed on Dec. 8, 2010 and titled LIQUID FUELS FROM HYDROGEN, OXIDES OF CARBON, AND/OR NITROGEN; AND PRODUCTION OF CARBON FOR MANUFACTURING DURABLE GOODS; and filed on Feb. 14, 2001 and titled ENGINEERED FUEL STORAGE, RESPECIATION AND TRANSPORT.

I claim:

1. A method for processing a hydrogen donor, comprising:
   dissociating a first hydrogen donor mass into first dissociation products by adding energy to the first hydrogen donor mass, wherein the energy includes waste heat generated by a combustion process carried out in a combustion chamber;
   from the first dissociation products, providing:
      (a) a structural building block; and
      (b) a hydrogen-based fuel;
   transferring heat from at least one component selected from the group consisting of the structural building block, the hydrogen-based fuel, and the first dissociation products to a second hydrogen donor mass;
   dissociating the second hydrogen donor mass into second dissociation products; and
   from the structural building block, providing an architectural construct.

2. The method of claim 1, further comprising supplementing the waste heat with heat obtained from a sustainable, renewable energy source.

3. The method of claim 2 wherein supplementing the waste heat includes supplementing the waste heat with solar energy.

4. The method of claim 2 wherein supplementing the waste heat includes supplementing the waste heat with wind energy.

5. The method of claim 1 wherein the first hydrogen donor mass has a first energy and the hydrogen-based fuel has a second energy greater than the first.

6. The method of claim 5 wherein the first energy includes a first dissociation energy and wherein the second energy includes a second dissociation energy.

7. The method of claim 1, further comprising forming the structural building block and the hydrogen-based fuel from the dissociation products.

8. The method of claim 1 wherein providing the architectural construct includes forming a graphene construct from dissociated carbon, and wherein the process further comprises:
   adsorbing hydrogen to the graphene construct;
   releasing the hydrogen from the graphene construct; and
   combusting the hydrogen to provide energy for dissociating the second hydrogen donor mass.

9. The method of claim 1 wherein the first hydrogen donor mass includes ammonia.

10. The method of claim 1 wherein the first hydrogen donor mass includes hydrocarbon.

11. The method of claim 1, further comprising adding steam to the first hydrogen donor mass.

12. The method of claim 1 wherein dissociating a first hydrogen donor mass includes dissociating a first hydrocarbon mass.

13. The method of claim 12 wherein dissociating a first hydrocarbon mass includes dissociating a first methane mass.

14. The method of claim 1 wherein the first hydrogen donor mass includes a first mass of diesel fuel, and the second hydrogen donor mass includes a second mass of diesel fuel and wherein the method further comprises adding hydrogen obtained from dissociating the first mass of diesel fuel to the second mass of diesel fuel to aid in dissociating the second mass of diesel fuel.

15. A method for processing a hydrocarbon, comprising:
dissociating a first hydrocarbon mass into first dissociation products by adding energy to the first hydrocarbon mass, wherein the energy includes:
   (a) waste heat generated by a combustion process carried out in a combustion chamber; and
   (b) energy from a sustainable energy source, and wherein the first hydrocarbon mass has a first dissociation energy;
from the first dissociation products, providing:
   (a) a carbon-based structural building block; and
   (b) a hydrogen-based fuel having a second dissociation energy greater than the first dissociation energy;
transferring heat from at least one of the carbon-based structural building block, the hydrogen-based fuel, and the dissociation products to a second hydrocarbon mass;
dissociating the second hydrocarbon mass into second dissociation products; and
from the structural building block, providing an architectural construct.

16. The method of claim 15 wherein:
dissociating a first hydrocarbon mass includes dissociating a first mass of methane;
dissociating a second hydrocarbon mass includes dissociating a second mass of methane; and
providing a hydrogen-based fuel includes providing hydrogen released by dissociating the first mass of methane; and wherein the method further comprises:
forming graphene from carbon released by dissociating the first mass of methane.

* * * * *

UNITED STATES PATENT AND TRADEMARK OFFICE
CERTIFICATE OF CORRECTION

PATENT NO. : 8,771,636 B2
APPLICATION NO. : 13/684987
DATED : July 8, 2014
INVENTOR(S) : Roy Edward McAlister Page 1 of 1

It is certified that error appears in the above-identified patent and that said Letters Patent is hereby corrected as shown below:

ON THE TITLE PAGE:

On page 4, in column 1, under "Other Publications", line 8, delete "Technoloigy" and insert -- Technology --, therefor.

On page 4, in column 2, under "Other Publications", line 17, delete "Collodial" and insert -- Colloidal --, therefor.

IN THE SPECIFICATION:

In column 1, line 13, delete "HYDROGENT" and insert -- HYDROGEN --, therefor.

In column 1, line 18, delete "The present application" and insert -- U.S. patent application Ser. No. 13/027,208 --, therefor.

In column 10, line 48, delete "molecular," and insert -- molecular --, therefor.

Signed and Sealed this
Eighteenth Day of November, 2014

Michelle K. Lee
*Deputy Director of the United States Patent and Trademark Office*